Nov. 5, 1946.       O. J. HUELSTER       2,410,444
SELF-LOCKING NUT
Filed June 16, 1944

INVENTOR
Otto J. Huelster
BY
Kenyon & Kenyon
ATTORNEYS

Patented Nov. 5, 1946

2,410,444

UNITED STATES PATENT OFFICE 2,410,444

SELF-LOCKING NUT

Otto J. Huelster, Waterbury, Conn., assignor to Scovill Manufacturing Company, Waterbury, Conn., a corporation of Connecticut Application June 16, 1944, Serial No. 540,581

6 Claims. (Cl. 151—21)

This invention relates to self-locking nuts.

An object of this invention is an all-metal self-locking nut of high efficiency, of low cost, of simple structure and of easy fabrication with standard machinery.

A self-locking nut embodying the invention comprises a cup-shaped sheet metal shell of polygonal configuration having a central bottom aperture. In the shell there is provided an apertured threaded nut member of standard construction which fits the shell and rests on the shell bottom. An interiorly threaded tubular member has a plurality of bowed spring legs extending from one end of the member with their ends engaging one face of the nut member. The tubular member also has a plurality of lugs extending from the same end thereof into contact with the shell wall and having tapered ends fitting the shell corners. Tabs projecting from the shell rim overlie and engage said lugs. The threads in the nut member and the tubular member are identical, but the spacing of the tubular member from the nut member is such that the threads of the two members are slightly out of phase. The tabs retain the tubular member and nut member in assembled relation to the shell while the lugs prevent rotation of the tubular member relative to the nut member. A bolt screwed through the nut member and into the tubular member is securely gripped by the two thread members and the nut is securely locked on the bolt.

Other objects, novel features and advantages of this invention will become apparent from the following specification and accompanying drawing, wherein.

Figure 3:
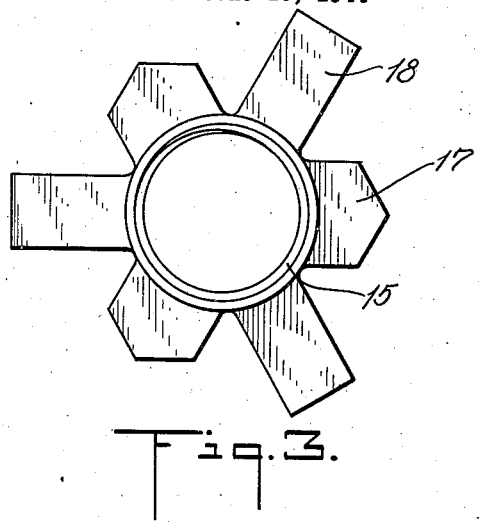
Fig. 3 is a plan view of the tubular member during a stage of its production.
Figure 1:
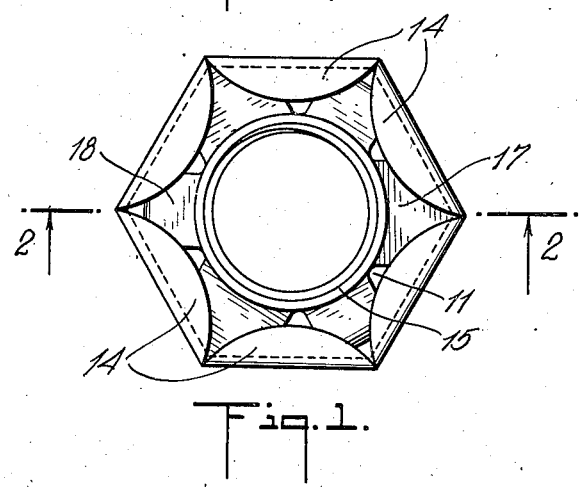
Fig. 1 is a plan view of a nut embodying the invention.

A sheet metal cup-shaped member or shell 10 is preferably of hexagonal cross-section both on its interior and its exterior and receives a standard type hexagonal nut member 11, one face of which engages the bottom of the shell. The flat sides of the nut member 11 engage the flat inner surfaces of the shell 10 thereby preventing rotation of the nut member relative to the shell. The nut member 11 is provided with the usual threaded aperture 12 and in the bottom of the shell 10 there is provided an opening 13 of slightly greater diameter than the major diameter of the nut member thread. Each wall portion of the shell terminates in a tapered tab 14 which, when the shell is made, is in alinement with its associated wall portion.

Figure 2:
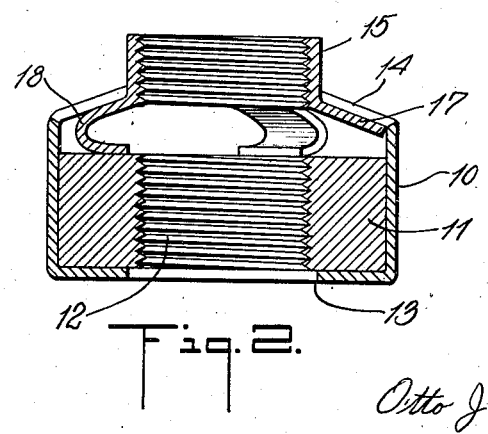
Fig. 2 is a section on the line 2—2 of Fig. 1.

A tubular member 15 is provided with six integral radially extending legs or lugs, three of which terminate in pointed ends and are designated 17 while the other three terminate in square ends and are designated 18, the latter legs being longer than the former legs. Both sets of legs are arranged at an angle to the tubular member 15. The arrangement of the legs is illustrated in Fig. 3 as they appear when initially formed. The legs 18 are provided with reverse bends as shown in Fig. 2, by which arrangement the ends of the legs 18 are offset axially of the member 15 from the ends of the legs 17.

The tubular member is assembled with the shell and nut member by engaging the ends of the legs 18 with the exposed face of the nut member 11 with the points of the legs 17 fitting into corners of the shell 10. The tabs 14 are then bent inwardly over and into engagement with the top surfaces of the legs 17 and 18, thus retaining the tubular member 15 in assembled relation to the shell and nut member. The resilience of the bowed legs 18 opposes movement of the tubular member toward the nut member 11 while the tabs 14 retain the tubular member in assembled relation to the nut member 11. The engagement of the ends of the lugs 17 with the wall portions of the shell 10 prevent rotation of the tubular member 15 relative to the shell.

The thread in the tubular member 15 is the same as the thread in the aperture 12 of the nut member 11. However, the arrangement of the tubular member 15 relative to the nut member 11 is such that the threads in the nut member and in the tubular member are slightly out of phase, and the relation is such that the screwing in of a bolt passing through the nut member 11 into the tubular member 15 tends to draw the tubular member toward the nut member. The out-of-phase relation is obtained by simultaneously tapping the nut member and tubular member after completion of the assembly thereof with the shell 10 and then moving the tubular member toward the nut member by a distance greater than one-half the thread pitch but less than the full thread pitch. Thus, when the nut is screwed onto a bolt, the two sets of threads cooperate with the bolt threads to produce a locking action and secure the nut to the bolt against accidental displacement by vibration or the like.

I claim:

1. A self-locking nut comprising a cup-shaped sheet metal shell of polygonal configuration having a central bottom aperture, an apertured nut member in said shell engaging the shell bottom, a tubular member, a plurality of bowed spring legs extending from one end of said member with their ends engaging the face of said nut member, a plurality of lugs extending from said end of said tubular member into contact with the shell wall and having tapered ends fitting shell corners and tabs projecting from the shell rim in overlying contact with said lugs, said nut member and said tubular member having identical but out-of-phase interior threads.

2. A self-locking nut comprising a cup-shaped sheet metal shell of polygonal configuration having a central bottom aperture, an apertured nut member in said shell engaging the shell bottom, a tubular member having integral resilient members engaging one end of said nut, means for retaining said tubular member and nut member in assembled relation with said shell, and means co-operating with said shell wall to prevent rotation of said tubular member relative to said nut member, said nut member and said tubular member having identical but out-of-phase interior threads.

3. A self-locking nut member according to claim 2 characterized by said retaining means being integral with said shell.

4. A self-locking nut comprising a cup-shaped sheet metal shell of polygonal configuration having a central bottom aperture, an apertured nut member in said shell engaging the shell bottom, a tubular member having integral resilient members engaging one end of said nut, means for retaining said tubular member and nut member in assembled relation with said shell, and means for preventing relative rotation of said tubular member and said nut member, said nut member and said tubular member having identical but out-of-phase interior threads.

5. A self-locking nut comprising a cup-shaped sheet metal shell of polygonal configuration having a central bottom aperture, an apertured nut member in said shell engaging the shell bottom and being of the same configuration as said shell to prevent rotation thereof relative to the shell, a tubular member, a plurality of radially extending legs integral with said member, certain of said legs having bowed portions engaging one face of said nut member and other legs having their ends contacting the shell wall to prevent rotation of said member relative to said shell, and means for retaining said tubular member and nut member in assembled relation with said shell, said nut member and said tubular member having identical but out-of-phase interior threads.

6. A self-locking nut comprising a cup-shaped sheet metal shell of polygonal configuration having a central bottom aperture, an apertured nut member in said shell engaging the shell bottom and being of the same configuration as said shell to prevent rotation thereof relative to the shell, a tubular member, a plurality of radially extending legs integral with said member, certain of said legs having bowed portions engaging one face of said nut member and other legs having their ends contacting the shell wall to prevent rotation of said member relative to said shell, and tabs projecting from the shell rim into overlying contact with said legs to retain said tubular member in assembled relation with said nut member and shell, said nut member and said tubular member having identical but out-of-phase interior threads.

OTTO J. HUELSTER.